3,030,400
COMPLEX ORGANOMETALLIC COMPOUNDS
Albert P. Giraitis, Baton Rouge, La., assignor to Ethyl Corporation, New York, N.Y., a corporation of Delaware
No Drawing. Filed July 26, 1960, Ser. No. 45,275
7 Claims. (Cl. 260—448)

This invention is concerned with complex organometallic compounds, particularly complex organoaluminum compounds and a method for their preparation; this application being a continuation-in-part of my prior application Serial No. 529,332, filed August 18, 1955, which in turn was a continuation-in-part of my prior application Serial No. 513,630, filed June 7, 1955. Both of said prior applications are now abandoned.

Certain complex organometallic compounds are known, particularly of the metal aluminum. By way of example, sodium tetraethylaluminum is known, but presently not commercially available. Likewise, complexes of alkali metal halides or quaternary ammonium halides with trialkylaluminum compounds are also known. In addition, complexes of certain alkali metal hydrides with trialkylaluminum compounds have been prepared. These and other known complex organometallic compounds suffer particular inherent disadvantages which have thus limited their application and consequently prevented their commercialization. Among the factors contributing toward these deterrents is the fact that the known complexes have very high melting points and are comparatively unstable. Further, in most cases, the known complexes are difficult to prepare requiring involved processing. Because of these and other disadvantages of the known compounds, it is desirable to provide additional organometallic complexes which are more useful and practical than those presently known.

Accordingly, an object of this invention is to provide new and novel organometallic compounds and a method for their preparation. A particular object is to provide new and novel complexes of organometallic compounds of greater utility than those known heretofore. A specific object is to provide unique complex organoaluminum compounds. These and other objects of the invention will be evident as the discussion proceeds.

The above and other objects of this invention are accomplished by the provision of the unique complexes of an alkali metal aluminum tetrahydride with a trihydrocarbon group III–A metal compound. Such complexes wherein sodium or lithium aluminum hydride, especially lithium, are the alkali metal aluminum hydride and trialkyl aluminum compounds, especially those wherein the alkyl groups contain up to and including about 8 carbon atoms, are the trihydrocarbon group III–A metal compounds, comprise a particularly unique embodiment. Likewise, because of their greater stability and physical characteristics, such complexes wherein 2, 3, or 4 moles of the trialkyl aluminum compound are complexed with one mole of sodium or lithium aluminum hydride are a particularly preferred embodiment of the invention. The complexes are readily prepared by mixing the alkali metal aluminum hydride with the requisite amount of the trihydrocarbon group III—A metal compound and heating, if necessary.

The novel compositions of this invention are particularly unique in that they provide complex compounds having 4 reactive hydrogens as well as carbon to metal bonds, and yet have the desirable attribute of low melting points with high stability. In general, most of the complexes are readily liquified thus providing the normally solid alkali metal aluminum hydride in a highly active liquid form wherein the combined action of the hydrogen and the carbon to metal bonds can be utilized without the necessity of any additional solvents. In addition, the complexes are of greater stability than are their individual components uncomplexed, e.g. 1 mole of lithium aluminum tetrahydride complexed with 2 moles of triethylaluminum is more stable than either lithium aluminum tetrahydride or triethylaluminum uncomplexed. Further, the compounds are quite easy to prepare and easier to handle than the individual alkali metal aluminum hydrides or organo group III–A metal compounds uncomplexed. Additionally, the complexes are of greater and more effective use than are the alkali metal aluminum hydrides or the organoaluminum compounds uncomplexed. These and other advantages of the novel compositions and process of this invention will be evident as the discussion proceeds.

The alkali metal aluminum tetrahydrides are those of the metals of group I–A of the periodic chart of the elements having the typical formula $MA1H_4$ wherein M is a group I–A metal, e.g. lithium, sodium, potassium, rubidium, and cesium. Thus, the alkali metal or group I–A metal aluminum hydrides include sodium, lithium, potassium, rubidium, or cesium aluminum tetrahydride. If desired, mixtures of such compounds can be employed in forming the complexes. Sodium and lithium aluminum tetrahydride are particularly preferred because of their greater availability and their more useful properties. Lithium aluminum hydride comprises an especially preferred alkali metal aluminum hydride taking advantage not only of its greater availability and usefulness, but also its low weight characteristics.

The trihydrocarbon group III–A metal compounds of the complexes are such compounds of the true metals aluminum, thallium, indium and gallium of group III–A of the periodic chart of the elements. Such compounds can be, for example, aliphatic, cyclo aliphatic, and aromatic group III–A metal compounds, including, for example, trialkyl, trialkenyl, trialkynyl, tricycloalkyl, tricycloalkenyl, and triaryl group III–A metal compounds and such compounds containing mixtures of such radicals. By way of illustration of the trihydrocarbon group III–A metal compounds employed, the following are typical examples: trimethylaluminum, gallium, indium, or thallium; triethylaluminum, gallium, indium, or thallium; triisobutylaluminum, gallium, indium, orthallium; trihexylaluminum, gallium, indium, or thallium; trioctylaluminum, gallium, indium, or thallium; tridecylaluminum, gallium, indium, or thallium; trioctadecylaluminum, gallium, indium, or thallium; tri-5-hexenylaluminum, gallium, indium, or thallium; tri-5-hexynylaluminum, gallium, indium, or thallium; tricyclohexylaluminum, gallium, indium, or thallium; tricyclohexenylaluminum, gallium, indium, or thallium; triphenylaluminum, gallium, indium, or thallium; tribenzylaluminum, gallium, indium, or thallium; trinaphthylaluminum, gallium, indium, or thallium; ethyl dimethyl aluminum, gallium, indium, or thallium; and the like. While trihydrocarbon group III–A metal compounds of the type exemplified above are preferred, it is to be undertood that the hydrocarbon portions can be further substituted, particularly with organic substituents. Also, the chain lengths of the hydrocarbon groups can be as high as 30 carbon atoms and higher, but generally contain up to and including 18 carbon atoms. Of the trihydrocarbon group III–A metal compounds, the tri-saturated or aromatic hydrocarbon metal compounds, especially the trialkylaluminum compounds, particularly those wherein the alkyl groups contain between about 1 to 8 carbon atoms are preferred since such are more readily available and of greater utility. In this regard, triethylaluminum comprises an especially preferred embodiment.

The novel compositions of this invention are readily obtained by mixing the aforedescribed alkali metal aluminum hydrides with the requisite amount of trihydrocarbon group III–A metal compound. While in most instances reaction will readily occur upon mixing, it is preferable to gently heat the mixture in order to enhance the rate of reaction. Thus, the mixture can be heated to temperatures as high as about 150° C. or higher and is generally not below about 0° C. with temperatures above about 30° C. being preferred. Another criterion of the operating temperature, particularly when both reactants are solid, is to heat the mixture above the melting point of one of the reactants, especially the trihydrocarbon group III–A metal compound, and continue the heating until all of the alkali metal aluminum hydride goes into solution. Alternatively, a suitable inert organic solvent, such as the hydrocarbons, especially aromatic hydrocarbons, and ethers, or amines described hereinafter, can be employed to solubilize one of the reagents, especially the trihydrocarbon group III–A metal compound, and then heat is applied as required to accelerate formation of the complex.

The proportions of the reagents employed in forming the novel complexes are subject to considerable latitude since generally when excesses of either reagent are employed, particularly the trihydrocarbon group III–A metal compounds, such excesses will generally separate into a different phase which is readily recoverable from the desired complex. Thus, for example, the concentration of the alkali metal aluminum hydride can be varied from about 0.01 to 100 percent and even 200 percent of the organo-aluminum compound. It is preferable, however, that between about ½ to 4 moles inclusive of the trihydrocarbon group III–A metal compound be employed per mole of the alkali metal aluminum hydride. An especially preferred embodiment comprises the employment of essentially 2, 3, or 4 moles of the trihydrocarbon group III–A metal compound per mole of the alkali metal aluminum hydride since the complexes thereby formed are particularly unique having greater stability as well as being liquid at room temperature.

Thus, the compositions of this invention can be represented by the following typical structural formula:

wherein M is an alkali metal otherwise known as a group I–A metal, M' is a true metal of group III–A, R is a hydrocarbon radical as described above in connection with the trihydrocarbon group III–A metal compound, and "n" is a number or fraction thereof preferably between ½ and 4 inclusive. By way of illustration of typical of the novel complexes of this invention, the following are illustrative, but non-limiting. The complex of one mole of lithium aluminum tetrahydride with ½, 1, 2, 3, or 4 moles of triethyl aluminum, the complex of 1 mole of sodium aluminum tetrahydride with ½, 1, 2, or 3 moles of trimethyl, triethyl, triisobutyl, trioctyl, tricyclohexyl, or triphenylaluminum; a complex of 1 mole of potassium aluminum tetrahydride with ½, 1, 2, 3, or 4 moles of triethyl, trioctadecyl, tricyclohexenyl, or triphenyl aluminum; and the complexes when other alkali metals are substituted for lithium, sodium, and potassium and other group III–A metals are substituted for aluminum in the above and other illustrative examples. The preferred compounds of this invention are those obtained from sodium or lithium aluminum hydride, especially those complexed with trialkyl aluminum compounds in which the alkyl groups contain up to and including about 8 carbon atoms. In such preferred embodiments, compounds which contain 2, 3, or 4 moles of the trialkyl aluminum compound complexed with 1 mole of lithium aluminum hydride or 2 or 3 moles of trialkyl aluminum compound with 1 mole of sodium aluminum hydride are even more especially preferred because of their greater stability and because they are liquid at room temperature. In this regard, such compounds wherein 2 moles of trialkyl aluminum compound are complexed with one mole of lithium or sodium aluminum tetrahydride are particularly unique in that they are of greater stability and of more diversified usage than other molar proportions of the trialkyl aluminum compounds. In those instances wherein it is desired to employ complexes of this invention for uses at comparative low temperatures, lithium and sodium aluminum hydride complexed with 3 or 4 moles of trialkyl aluminum compound are particularly unique since these complexes are liquid at temperatures as low as about −40° C.

The novel compounds and the process by which they are prepared will be more readily illustrated from a consideration of the following examples in which all parts are by weight unless otherwise specified.

*Example I*

To a reactor equipped with internal agitation and external heating means as well as a means for maintaining an inert nitrogen atmosphere was added 90 parts of triethylaluminum. Then 10 parts of sodium aluminum tetrahydride of 95 percent purity was added to the triethylaluminum. The sodium aluminum tetrahydride immediately began to dissolve in the triethylaluminum forming two separate liquid layers. The excess triethylaluminum was removed by decantation as the upper layer and the lower layer was filtered to remove the impurities obtained from the sodium aluminum hydride employed. There remained a liquid complex of 1 mole of sodium aluminum tetrahydride with 3 moles of triethylaluminum ($NaAlH_4 \cdot 3AlEt_3$). A portion of the complex thus formed was analyzed. Analysis showed 6.06 percent sodium, 26.30 percent aluminum, and 31.7 millimoles of gas evolved per gram sample, whereas the theoretical for $NaAlH_4 \cdot 3AlEt_3$ is 5.81 percent sodium, 27.3 percent aluminum, and 32.7 millimoles of gas evolved per gram sample.

When the above example is repeated except that the reaction is conducted at 100° C., the complex

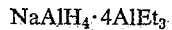

is obtained. With sodium aluminum tetrahydride, complexing with the fourth mole of triethylaluminum is more readily obtained with heating.

The procedure of Example I was repeated with the exception that 3.75 parts of 80 percent pure sodium aluminum tetrahydride and 4.0 parts of trimethylaluminum were mixed and gradually heated. Upon heating, the mixture became completely solid at about 40–60° C. and further heating resulted in a homogeneous melt at about 100° C. Petroleum ether, in minor amount, was then added to extract any excess trimethylaluminum. The mixture was then filtered and the petroleum ether phase decanted. The product was then dissolved in toluene and again extracted with petroleum ether, the latter phase being separated. The product was then heated to remove the toluene and dried. In this manner, 7.6 parts of product were obtained which, on analysis, showed 36.07 percent aluminum, 18.3 percent sodium, and 42.9 millimoles of gas evolved per gram sample, whereas the theoretical for sodium aluminum tetrahydride·trimethylaluminum ($NaAlH_4 \cdot AlMe_3$), is 42.8 percent aluminum, 18.3 percent sodium, and 55.5 millimoles of gas evolved per gram of sample. The variance in the aluminum and gas evolution analysis is attributed to impurities in the starting sodium aluminum tetrahydride.

*Example III*

Employing the procedure of Example I, 13.3 parts of 79 percent pure sodium aluminum tetrahydride were mixed with 22.4 parts of triethylaluminum and heated at 80° C. for 2 hours. At this temperature, a homogeneous liquid product resulted which is the 1:1 complex. A portion of the product was measured for conductivity and found to have a specific conductivity of 0.00963 ohm$^{-1}$cm.$^{-1}$ at 100° C. It had a melting point of 60° C. To another portion of the product was added about 80 parts of toluene to precipitate impurities contained in the starting materials. The mixture was then filtered and the majority of the toluene removed by distillation. In this manner, the complex product $NaAlH_4 \cdot AlEt_3$ was obtained. Then about 300 parts of petroleum ether was added to the toluene solution remaining. White solids precipitated from the solution which were filtered and dried and amounted to 14 parts. The petroleum ether and toluene solution was further distilled to reduce the volume and in this manner 6 parts of additional precipitate was obtained which was filtered and dried making a total of 20 parts of product. A portion of the dried material exhibited solubility in toluene, ether, and insolubility in petroleum ether. The product exhibited little flammability to the atmosphere. The product thus obtained on analysis showed 21.63 percent sodium, 24.97 percent aluminum, and 33.5 millimoles of gas evolved per gram sample showing that the product was converted to sodium diethyl aluminum dihydride ($NaEt_2AlH_2$), which contains 20.9 percent sodium, 24.5 percent aluminum, and 36.3 millimoles of gas evolved per gram sample. Mass spectroscopic analysis of this product showed 33.8 mole percent hydrogen and 29.1 mole percent ethane showing essentially a 1:1 mole ratio of hydrogen to ethyl groups in the product.

The above example illustrates another unique characteristic of the compositions of this invention, and the process for their manufacture. While complexes of ½, 1, 2, 3, or 4 moles of the trihydrocarbon group III–A metal compound, particularly wherein the hydrocarbon groups contain 2 or more carbon atoms, with one mole of the alkali metal aluminum tetrahydride are highly stable in the absence of aliphatic hydrocarbons such as hexanes, decanes, nonanes, cyclohexanes, and petroleum ether, they can be converted to different products having one or more less moles of the trihydrocarbon group III–A metal compound removed from the complex than would be expected to be combined by the molar ratios employed by conducting the reaction or, alternatively and preferably, by extracting the reaction product with sufficient aliphatic hydrocarbon to remove the desired amount of hydrocarbon group III–A metal compound or hydrocarbon group III–A metal hydride compound from the complex. The aliphatic hydrocarbons extract primarily hydrocarbon group III–A metal compounds and hydrocarbon group III–A metal hydride ecompounds, e.g. triethylaluminum and diethylaluminum hydride, away from the complex initially formed. By way of example, in Example III the stoichiometry was such that the 1:1 complex was initially prepared, but upon extracting this product with the aliphatic hydrocarbon, petroleum ether, this complex was converted to the different product, sodium diethylaluminum dihydride. Therefore, this example also illustrates a utility of the products of the present invention, especially the products having 1, 2, 3, or 4 moles of the trihydrocarbon group III–A metal compound complexed with 1 mol of the alkali metal aluminum tetrahydride. Thus, it is to be understood that the use of aliphatic hydrocarbons as reaction media or extractants are less desirable and to be avoided when conversion to other complex compounds with simultaneous extraction of by-product hydrocarbon group III–A metal compounds or hydrocarbon group III–A metal hydride compounds is not desired.

*Example IV*

Employing the procedure of Example I, 6.8 parts of lithium aluminum hydride were added to 20.5 parts of triethylaluminum and the mixture heated for 3 hours while maintaining the temperature between 50 and 90° C. The reaction mixture became entirely liquid showing the formation of the complex, $LiAlH_4 \cdot AlEt_3$. Then about 180 parts of toluene were added resulting in a homogeneous solution. Next, 200 parts of petroleum ether were added which precipitated solids. The mixture was then filtered and the solids obtained were dried resulting in a recovery of 9 parts. This product was crystalline in structure. The filtrate of the above filtration was then reduced in volume to about 50 parts and additional petroleum ether added whereby additional precipitate formed which was also dried and amounted to 7.0 parts. Analysis of the combined solids showed 9.7 percent lithium, 47.3 percent aluminum, and 56.4 millimoles of gas evolved per gram sample. This analysis corresponds to an equimolar mixture of $LiAlH_4 \cdot \frac{1}{2} AlEt_3$ and $LiAlH_4$ which theoretically contains 10.5 percent lithium, and 50.7 percent aluminum.

Thus, the above example again illustrates that extraction of the product with an aliphatic hydrocarbon converts the product to a different complex compound, in this instance from the 1 to 1 molar complex to 1 to ½ molar complex.

*Example V*

Again employing the procedure of Example I, 3.86 parts of 98 percent pure lithium aluminum hydride was added to 20.2 parts of triethylaluminum. Thus, the mole ratio of triethylaluminum to lithium aluminum tetrahydride employed was 2:1. The mixture was heated at 50–80° C. for 5 hours. At the end of this time, the reaction mixture was filtered removing 0.1 part of impurities obtained from lithium aluminum hydride and then cooled. A sample of the white crystalline product formed melted at 30° C. Analysis of the product thus obtained showed 2.5 percent lithium, 29.1 percent aluminum, and 35.5 millimoles of gas evolved per gram sample, whereas the theoretical for $LiAlH_4 \cdot 2AlEt_3$ is 2.6 percent lithium, 30.5 percent aluminum, and 37.6 millimoles of gas per gram of sample. The product had a specific conductivity of 0.00146 $ohm^{-1}cm.^{-1}$ at 100° C.

*Example VI*

The procedure of Example V was repeated essentially as described using 4.86 parts of lithium aluminum hydride and 40.5 parts of triethylaluminum. Thus, the molar ratio was 3 moles of triethylaluminum per mole of lithium aluminum hydride. The mixture was heated for a period of 4 hours and after recovering as described, a liquid product was obtained. Analysis of the product showed 1.69 percent lithium, 27.10 percent aluminum, and 30.50 millimoles of gas evolved per gram sample, whereas the complex, $LiAlH_4 \cdot 3AlEt_3$, theoretically requires 1.84 percent lithium, 28.42 percent aluminum, and 34.20 millimoles of gas per gram sample. The product had a specific conductivity of 0.00255 $ohm^{-1}cm.^{-1}$ at 100° C. The product was liquid even at −40° C.

*Example VII*

Example V was repeated as described except that 3.6 parts of lithium aluminum hydride were reacted with 41 parts of triethylaluminum. Thus, the molar ratio was 4 moles of triethylaluminum to 1 mole of lithium aluminum hydride. The product obtained was a clear liquid which analyzed 1.26 percent lithium, 26.21 percent aluminum, and 30.80 millimoles of gas evolved per gram of sample, whereas $LiAlH_4 \cdot 4AlEt_3$ theoretically contains 1.41 percent lithium, 27.22 percent aluminum, and 32.30 millimoles of gas evolved per gram of sample. The product, $LiAlH_4 \cdot 4AlEt_3$, has a density of 0.7799 at 100° C. and a viscosity of 4.93 centipoises at 100° C. The product had a specific conductivity of 0.00372 $ohm^{-1} cm.^{-1}$ at 100° C. To half of the product obtained was added 5 parts of sodium tetraethylaluminum with gentle heating. All of the sodium tetraethylaluminum went into solution thus demonstrating another unique feature of the compositions of this invention. Sodium tetraethylaluminum is insoluble in either triethylaluminum or lithium aluminum hydride.

It is to be noted, from a consideration of Examples V, VI, and VII that quite unexpectedly the specific conductivities of the complexes increased with increase of molar proportion of the triethylaluminum complexed with the lithium aluminum hydride whereas one would expect that it should decrease.

Example VIII

Example VII was repeated essentially as described with exception that 2.6 parts of 95 percent pure lithium aluminum tetrahydride were reacted with 19 parts of trimethylaluminum. Thus, the molar ratio was 4 moles of trimethylaluminum to 1 mole of lithium aluminum tetrahydride. The reaction mixture was heated between 80–150° C. for 4 hours. Upon cooling to room temperature, solid $LiAlH_4 \cdot 4Me_3Al$ was obtained.

Example IX

In this run, 5.2 parts of sodium aluminum tetrahydride were reacted with 20 parts of triisobutyl aluminum at 70–80° C. for 4 hours. Thus, the molar ratio was 1:1. The reaction mixture was cooled whereby it solidified. The product $NaAlH_4 \cdot Al(i\text{-butyl})_3$, can be used as obtained.

Example X

When Example VII is repeated with exception that an equivalent amount of potassium aluminum tetrahydride is substituted for the lithium aluminum tetrahydride, the complex $KAlH_4 \cdot 4AlEt_3$ is obtained.

Example XI

The complex $RbAlH_4 \cdot 4AlEt_3$ is obtained when essentially 4 moles of triethylaluminum are reacted with 1 mole of rubidium aluminum tetrahydride according to the procedure of Example VII.

Example XII

Employing the procedure of Example VII, when 2 moles of trioctylaluminum are reacted with 1 mole of lithium aluminum tetrahydride, the complex $$LiAlH_4 \cdot 2Al(C_8H_{17})_3$$

is obtained.

Example XIII

When Example XII is repeated substituting an equivalent amount of trioctadecylaluminum for the trioctylaluminum, the complex $LiAlH_4 \cdot 2Al(C_{18}H_{37})_3$ is obtained.

Example XIV

The complex  is obtained when Example VII is repeated substituting an equivalent amount of tricyclohexylaluminum for triethylaluminum.

Example XV

Employing the procedure of Example VII, when essentially 4 moles of tri-5-hexenylaluminum are reacted with 1 mole of lithium aluminum tetrahydride at 125° C. for 4 hours, the complex $LiAlH_4 \cdot 4Al(5\text{-hexenyl})_3$ is obtained.

Example XVI

Repeating Example VII with exception that triphenylaluminum is substituted for triethylaluminum employing the dimethyl ether of diethylene glycol as a reaction solvent, the complex $LiAlH_4 \cdot 4Al$ triphenyl is obtained dissolved in and complexed with the dimethyl ether of diethylene glycol.

Example XVII

When Example VII is repeated substituting triethylindium for triethylaluminum, the complex $LiAlH_4 \cdot 4InEt_3$ is obtained.

Example XVIII

When essentially 2 moles of triethyl thallium are reacted with 1 mole of lithium aluminum tetrahydride at 50° C. for 3 hours, the complex $LiAlH_4 \cdot 2TlEt_3$ is obtained.

The above examples are presented by way of illustration and it is not intended to be in any way limited thereto. It will now be evident that other alkali metal aluminum tetrahydrides can be substituted as well as other trihydrocarbon group III–A metal compounds in varying molar proportions of between ½ to 4 moles inclusive of the latter per mole of the alkali metal aluminum hydride to produce similar complexes.

Certain of the above examples have illustrated the employment of solvents. While a solvent is not essential in conducting the process, and usually undesired, certain solvents can be employed to advantage when both the reactants are solids at reaction conditions. For this purpose, various solvents are available including the organic solvents such as the hydrocarbons, especially aromatics; ethers; and amines, especially tertiary amines. While the solvents should be essentially inert in the system, they can form complexes with the reactants or products since such complexes will not hinder the principal reaction. The solvents are preferably saturated or aromatic since unsaturated moieties tend to add to the metal-hydrogen bonds. Likewise, they should be liquid under the reaction conditions. Typical examples of suitable solvents are ethers, such as dimethyl ether, diethyl ether, methylethyl ether, methylisopropyl ether, methyl-n-propyl ether, and mixtures thereof. Suitable polyethers are ethylene and diethylene glycol dialkyl ethers, such as the dimethyl, methylethyl, diethyl, methylbutyl, ethylbutyl, dibutyl, and butyllauryl ethers of ethylene and diethylene glycol; trimethylene glycol ethers, such as the dimethyl, diethyl, methylethyl ethers, etc.; glycerol ethers, such as trimethyl, dimethylethyl, diethylmethyl, etc.; and cyclic ethers, such as dioxane, and tetrahydrofuran. Typical amines suitable include aliphatic and aromatic amines and heterocyclic nitrogen compounds. The preferred amines are tertiary amines such as trimethylamine, dimethylethyl amine, triethylamine, dimethyl aniline, pyridine, tetraethylethylenediamine, N-methylmorpholine, and the like. Primary and secondary amines can also be used such as methylamine, dimethylamine, dibutylamine, and the like. Other suitable solvents include hydrocarbons such as the aromatics as toluene, xylene, benzene, mesitylene, etc. The aliphatic hydrocarbons are less desirable and generally to be avoided because of their conversion of the desired product to a different product as discussed in connection with Examples III and IV, particularly when the trihydrocarbon group III–A metal employed has 2 or more carbon atoms in each hydrocarbon group.

The solvents which are particularly preferred are the aromatic hydrocarbons which are liquid under the reaction conditions. In this connection, benzene, toluene and xylene comprise especially preferred embodiments. The proportions of the solvent can be varied over a wide range as between about 1 to 100 parts per part by weight of the trihydrocarbon group III–A metal reactant, but the solvent is generally employed in amount sufficient to provide a fluid reaction system.

The novel complexes of the present invention are of considerable utility. Because of their more desirable physical properties, they are more advantageously employed in many uses than are comparable, previously known complex organometallic compounds and organometallic compounds in general. By way of example, the compounds can be employed as selective reducing agents, for example, in the reduction of ketones to alcohols. The complex $LiAlH_4 \cdot 2AlEt_3$ is particularly well suited for this use. Further, as indicated above, the complexes exhibit desirable conductivity characteristics and therefore are useful in electrolytic systems. One such use involves the electrolysis using a lead anode and electrolytes containing the complexes of this invention. The complexes can be electrolyzed with various conducting electrodes to both generate hydrogen and produce aluminum plates or aluminum metal of high purity by applying a current to electrodes immersed in an electrolyte containing, and preferably consisting essentially of, the complexes of this invention, e.g. the complex $LiAlH_4 \cdot 4AlEt_3$. Because of their unusual conductivity characteristics, the complexes can also be employed in batteries for the generation of current by their reaction with suitable reagents such as an oxidizer. The complexes are also useful for the controlled generation of hydrogen. For example, when slowly reacted with water, a complex such as $LiAlH_4 \cdot 1$, 2, 3, or $4AlEt_3$ generates hydrogen in a uniform and efficient manner. Additionally, the complexes of this invention can be readily reacted and more effectively reacted with olefins such as ethylene in stoichiometric amount at temperatures between about 140 to 150° C. and pressures up to about 5000 p.s.i. to produce more fully alkylated products. By way of example, the products of any of the Examples I through XVIII can be reacted with ethylene, as described, to produce the corresponding alkali metal tetraethylaluminum compound in admixture with the trihydrocarbon Group III-A metal compound. These two products can be separated, if desired, by the usual physical operations, such as decantation, since two phases normally result, or by distillation. Another unique utility of the products of this invention is that they can be used as solvents for bimetallic organometallic compounds such as alkali metal tetraalkyl aluminum compounds providing the latter compounds in liquid systems at lower usable temperatures and additionally providing compositions useful as alkylating agents, in batteries, and the like. Other uses for the products of this invention will now be evident to those skilled in the art.

Having thus described the novel products and their method of preparation, it is not intended that the invention be limited except as set forth in the following claims.

I claim:

1. As a new composition of matter, a complex of an alkali metal aluminum tetrahydride with a trihydrocarbon group III-A metal compound.

2. A complex of an alkali metal aluminum tetrahydride with a trihydrocarbon aluminum compound.

3. As a new composition of matter, the complex of 1 mole of lithium aluminum tetrahydride with ½ mole of triethyl-aluminum.

4. As a new composition of matter, the complex of 1 mole of lithium aluminum tetrahydride with 1 mole of triethyl-aluminum.

5. As a new composition of matter, the complex of 1 mole of lithium aluminum tetrahydride with 2 moles of triethyl-aluminum.

6. As a new composition of matter, the complex of 1 mole of lithium aluminum tetrahydride with 3 moles of triethyl-aluminum.

7. As a new composition of matter, the complex of 1 mole of lithium aluminum tetrahydride with 4 moles of triethyl-aluminum.

No references cited.